Dec. 10, 1968  B. H. ASH  3,415,355
PLOW FEEDER WITH INVOLUTE BLADES
Filed Feb. 27, 1967  4 Sheets-Sheet 1
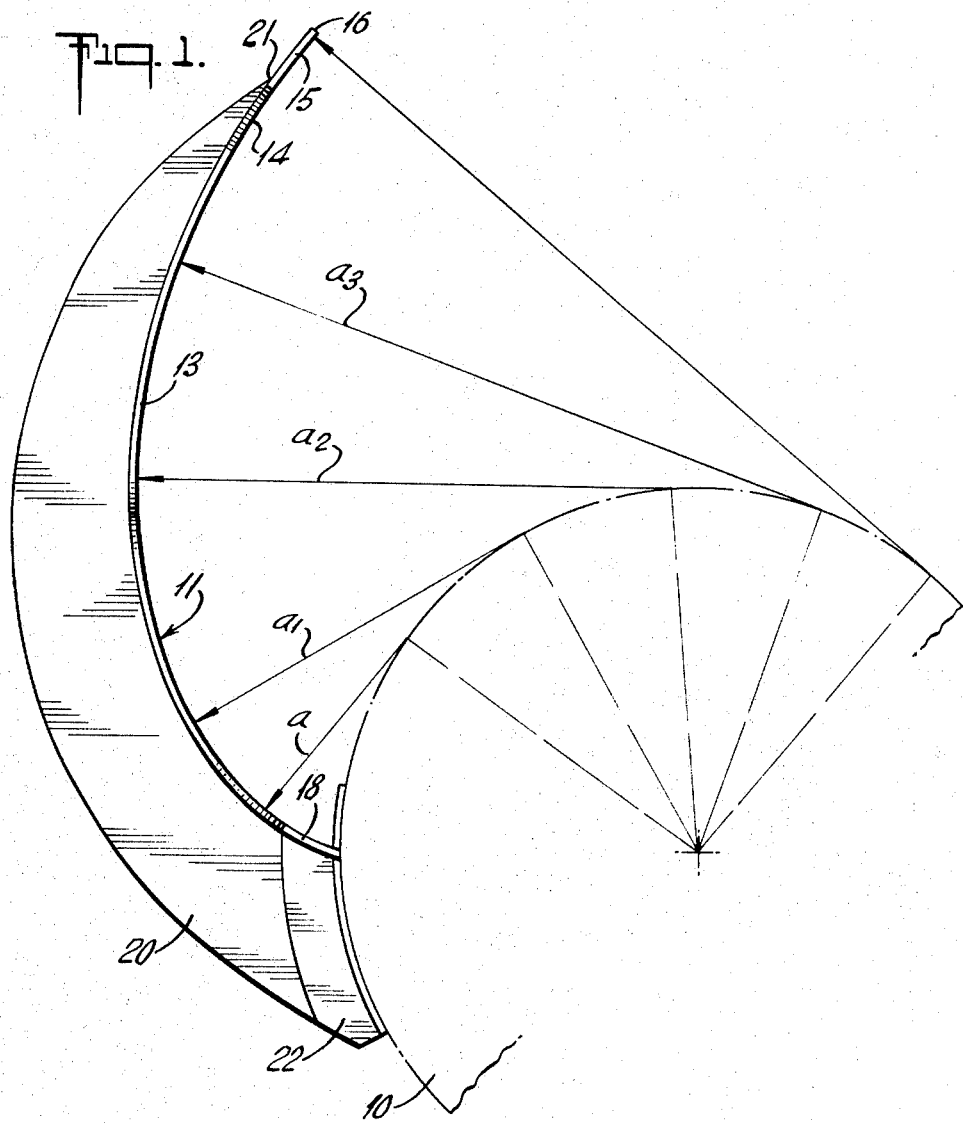
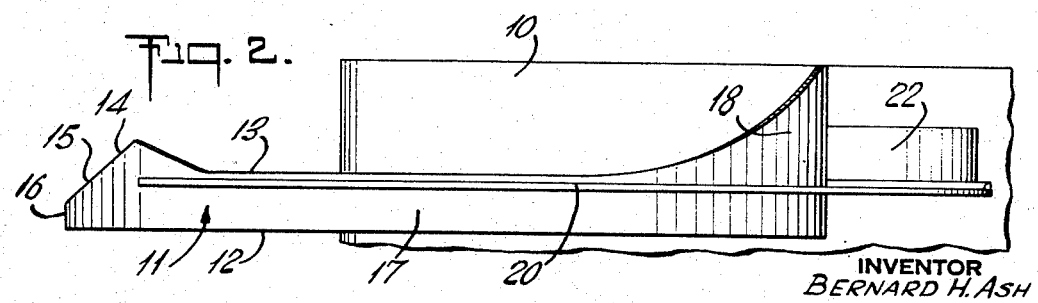
INVENTOR
BERNARD H. ASH
BY
John L. Shortley
ATTORNEY

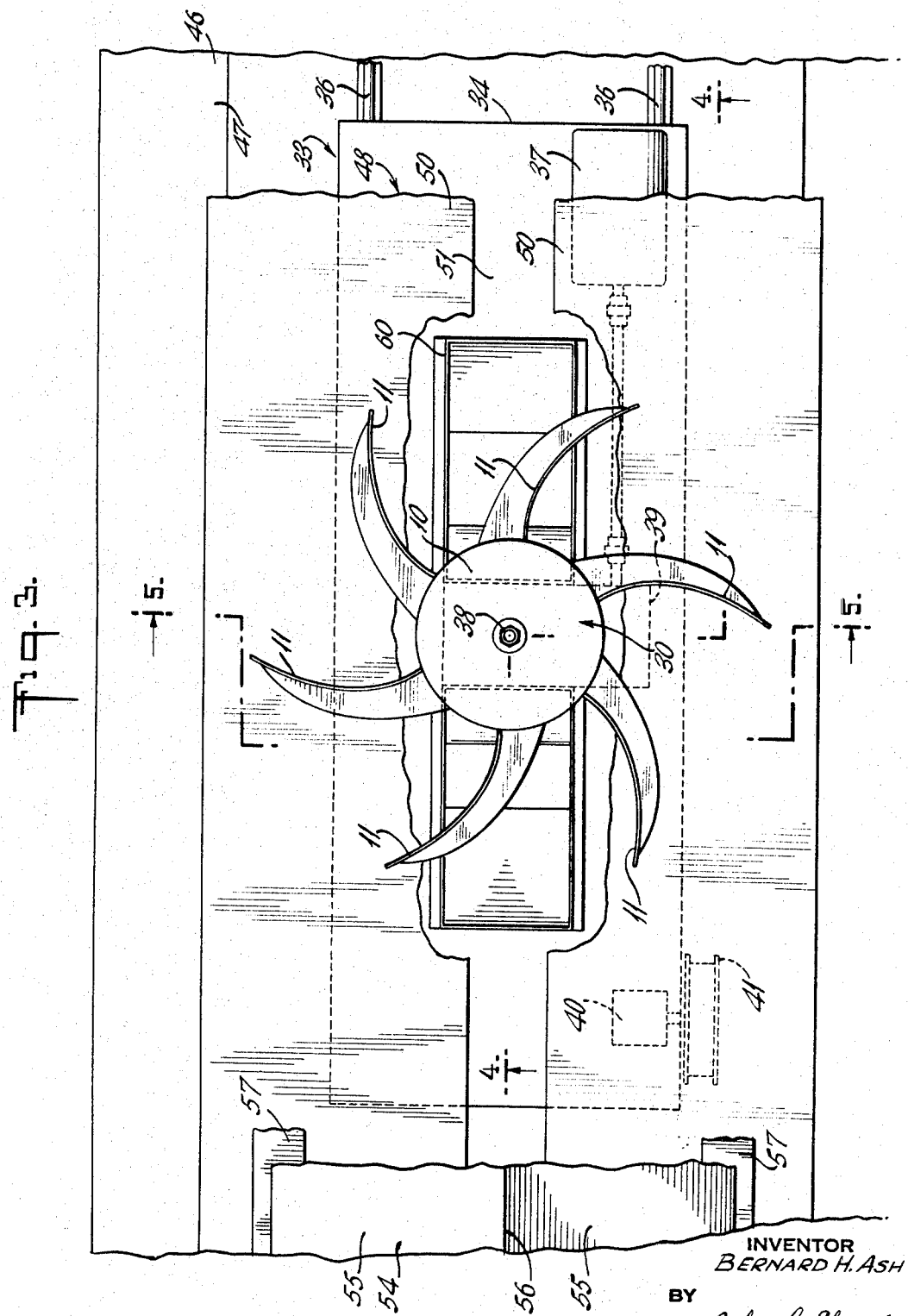

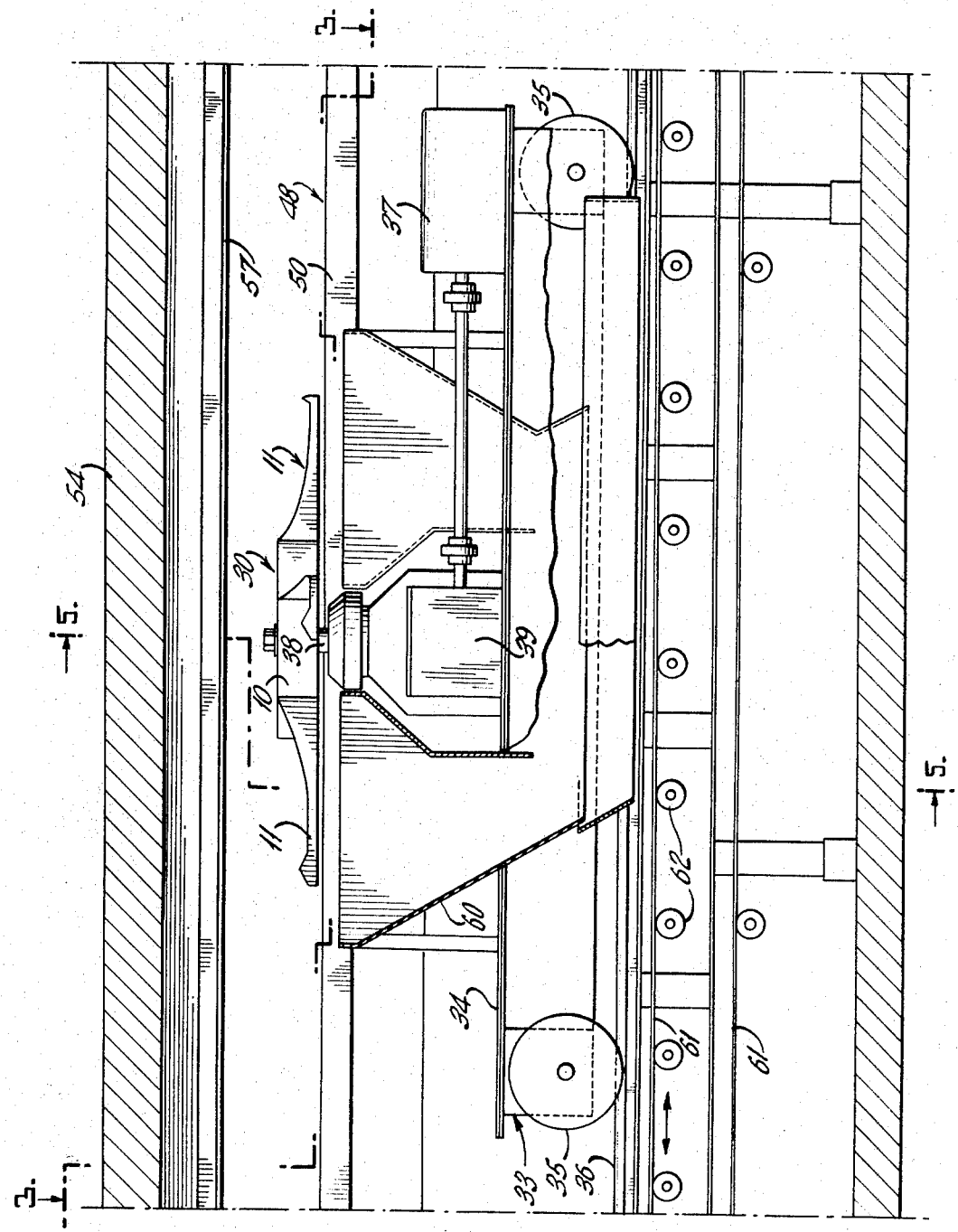

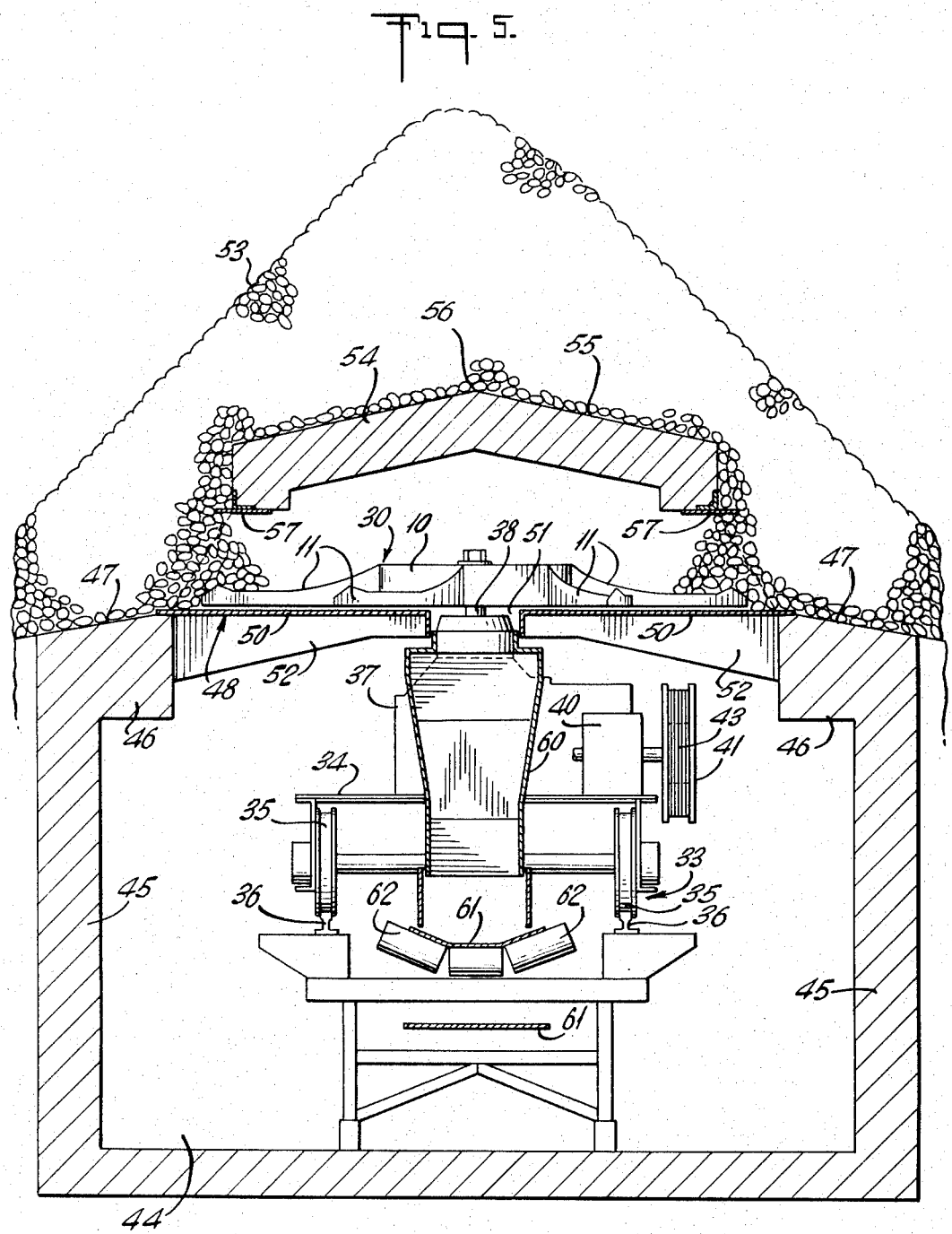

United States Patent Office 3,415,355
Patented Dec. 10, 1968

3,415,355
PLOW FEEDER WITH INVOLUTE BLADES
Bernard H. Ash, Los Angeles, Calif., assignor to Litton Industries, Inc., a corporation of Delaware
Filed Feb. 27, 1967, Ser. No. 618,655
6 Claims. (Cl. 198—209)

ABSTRACT OF THE DISCLOSURE

A plow feeder having a rotor rotatable about an axis and having one or more plow blades on the rotor with a contour following the involute of a circle concentric with this rotor axis.

---

The present invention relates to a plow feeder.

One object of the present invention is to provide a new and improved plow feeder, having plowing blades or arms, so contoured as to decrease substantially the power required for said feeder to plow through a penetrable mass of material and to unload it from a shelf or other support.

In accordance with the present invention, it has been found that if each blade on the rotor of a plow feeder is contoured to follow an involute of a circle concentric with said rotor and desirably the involute of the circular periphery of said rotor, i.e. if it follows a curve traced by any point of a flexible inextensible thread kept taut as it is wound upon or unwound from said circle, the power required to plow said blade through a mass of penetrable material and unload it will be substantially less than would be the case with a plow feeder having conventionally contoured blades. For example, an involute plow feeder in accordance with the present invention, would require substantially less kilowatt hours per unit of material unloaded than would a conventional type of plow feeder. The conventional blades on a plow feeder are usually radial of the rotor at the roots thereof near the rotor and then are contoured to trace a circular curve outwardly beyond said roots.

Other objects and features of the invention are apparent from the following description and from the accompanying drawings, in which FIG. 1 is a top plan view, somewhat diagrammatic of part of a plow feeder shown with a single involute blade in accordance with the present invention, and shows the manner in which its involute curvature is traced and generated;

FIG. 2 is a side view of the plow feeder shown in FIG. 1;

FIG. 3 is a top plan view of a plow feeder shown as part of an unloading plow apparatus and taken on lines 3—3 of FIG. 4;

FIG. 4 is a longitudinal section of the unloading plow apparatus taken approximately along the lines 4—4 of FIG. 3; and FIG. 5 is a transverse section of the unloading plow apparatus taken approximately along the lines 5—5 of FIG. 3.

Referring to FIGS. 1 and 2, there is shown a rotor 10, to which is attached an involute plowing blade 11, embodying the present invention. The blade 11 is shown of a construction particularly adapted to be used to unload a penetrable pile of material from a supporting shelf. The blade, for that purpose, has its forward concave face parallel to the axis of the rotor in the radial planes of the rotor 11. The lower longitudinal edge 12 of the blade 11 is adapted to pass directly over the shelf in the plowing operation of the blade, and for that purpose, extends substantially in a single plane throughout substantially its entire length. The upper longitudinal edge 13 of the blade 11 has a triangular barb conformation 14 at its outer end section with its outer side 15 extending from the outer end 16 of the blade. This outer blade end 16 is of reduced height compared with the height of the main intermediate body section 17 of the blade, to facilitate entry of said end into and its passage through the pile of material to be unloaded.

The upper longitudinal edge 13 of the blade in the intermediate main body section 17 of the blade 11 is parallel to the lower longitudinal edge 12 of the blade and at the base root section 18 of the blade, said upper edge curves to gradually widen said base root section to afford sufficient material for firm anchorage to the rotor 10.

To rigidize the blade 11, there is integrally secured thereto a rib 20, tapering towards its outer end, and terminating at one pointed or acute end 21 at the blade and at a distance inwardly of the outer end 16 of the blade. An angle 22 welded to the rib 20, conformably engaging the periphery of the rotor 10, and welded or otherwise affixed to the rotor, secures the blade 11 to the rotor.

FIG. 1 shows the manner in which the contour of the blade 11 is generated in accordance with the present invention. Pursuant to the invention, an inextensible element $a$ wound around the circular periphery of the rotor 10 is unwound from this periphery, and involute curve generated by one end of this element during this unwinding action, generates the curvature of the forward concave face of the blade. The different positions of the element $a$ are indicated by the subscripts 1, 2, 3, . . . .

The power and capacity advantages afforded by the involute plow blade of the present invention over the conventional plow blade of the general type referred to above have been proven by test on scale models and it was found that the involute plow blade had 23% greater capacity than a conventional plow blade of the same diameter and operated at a 7% reduction in horsepower. Therefore, for the same capacity blade the horsepower necessary to drive the involute plow blade would be reduced by approximately 30%. The reason for this reduction stems from the fact that in the involute plow blade, all the force components on the material being plowed off a shelf supporting said material are either along the shelf or toward the edge of the shelf. With the conventionel design, the major force component is basically into the pile requiring greater torque to drive the rotor.

FIGS. 3, 4 and 5 illustrate the principles of the present invention embodied in an operable involute blade plow feeder 30, shown carrying out a plowing operation. The plow feeder 30 of the present invention comprises the rotor 10 mounted with its axis vertical and carrying on its periphery a series of equally spaced involute plow blades 11, similar to that shown in FIGS. 1 and 2. The feeder 30 is supported on a carriage truck 33 comprising a platform 34 on wheels 35 riding on rails 36. The platform 34 supports a motor 37, which drives a vertical feeder dirve shaft 38 through a reduction gear unit 39. The feeder rotor 10 is secured to the upper end of this drive shaft 38.

The carriage truck 33 can be advanced along the rails 36 as the material is unloaded by any well-known expedient. For example, a reversible motor and reduction gear unit 40 drives a cable pulley 41. A pull cable 43 anchored at both ends at opposite ends of the course traversed by the carriage truck 33 is wound intermediate its anchored ends around the pulley 41.

The carriage truck 33 is enclosed in a tunnel 44 and travels along said tunnel in its plowing operation. This tunnel 44 has side walls 45 and top spaced walls 46 along the sides of said tunnel with downwardly and outwardly sloping top surfaces 47. In the space between these top walls 46 is a horizontal shelf 48 constituted by two similar parts 50, separated by a space 51 of uniform width extending along substantially the full course of travel of the plow feeder 30 along the tunnel 44 and transversely centered with respect to the axis of rotation of the plow feeder 30. These shelf parts 50 are supported by grid plates 52.

The plow shaft 38 extends upwardly through the space 51, and the rotor 10 and the blade 11 are located over and close to the shelf 48 in position to sweep material 53 thereon in divided form, such as ore, from said shelf to said space, as the plow feeder 30 rotates. This material 53 is supported on the top tunnel walls 46 and on the sides of the shelf 48. To prevent the material 53 from being massed over the rotor 10, there is centered over and spaced above the plow feeder 30, a hood 54 extending along substantially the full length of travel of the plow feeder and having an upper surface 55 sloping from a center summit 56 downwardly and outwardly, to cause the material thereon to gravitate towards the sides of said hood and onto the shelf 48. The outer sides of this hood 54 extend outwardly sufficiently to permit the material discharged from the sides therefrom and collected along the space between said hood sides and the shelf 48, to flow in positions to encompass the blades 11, while at the same time keeping the rotor 10 substantially clear of the material thereon. Adjustable plates 57 on the undersides of the hood 54 and projecting outwardly from the sides thereof, permit adjustments in the areas blocked by the hood.

The material plowed by the plow feeder 30 is discharged from the shelf 48 through the shelf space 51, through a chute 60 extending in the tunnel 44 and onto a conveyor belt 61 extending in said tunnel therealong to a discharge point, and supported on conveyor rolls 62. As the plow feeder 30 rotates, it also moves along the rails 36.

While the invention has been described with particular reference to specific embodiments, it is to be understood that it is not to be limited thereto but is to be construed broadly and restricted solely by the scope of the appended claims.

What is claimed is:

1. A plow feeder comprising a rotor rotatable about an axis and having one or more plow blades secured to said rotor and having a contour constituting substantially the involute of a circle concentric with said axis.

2. A plow feeder as described in claim 1, wherein said rotor has a circular periphery, and said circle is close to said periphery.

3. A plow feeder as described in claim 1, wherein said rotor has a circular periphery and the blade contour is the involute of said periphery.

4. A plow feeder as described in claim 1, wherein said blade has its forward concave face which follows said involute contour extending parallel to said axis in the radial planes of said rotor.

5. A plow feeder as described in claim 4, comprising a reinforcing rib secured to the rear convex face of said blade and extending longitudinally therealong in a plane transverse to the contoured plane of said blade.

6. A plow feeder as described in claim 4, said reinforcing rib tapering outwardly longitudinally and terminating adjacent said blade in an acute end.

References Cited
UNITED STATES PATENTS

| | | | |
|---|---|---|---|
| 2,989,171 | 6/1961 | Lorenz | 214—17 |
| 3,191,783 | 6/1965 | Henderson | 214—17 |

FOREIGN PATENTS

| | | |
|---|---|---|
| 223,642 | 5/1958 | Australia. |
| 1,383,741 | 11/1964 | France. |

EDWARD A. SROKA, *Primary Examiner.*

U.S. Cl. X.R.

198—36; 214—17